US012591798B2

(12) United States Patent
Chernoguzov et al.

(10) Patent No.: US 12,591,798 B2
(45) Date of Patent: Mar. 31, 2026

(54) QUANTUM SYSTEM CONFIGURED FOR CONDITIONAL TRANSPORT WITH JUST-IN-TIME WAVEFORM SELECTION

(71) Applicant: Quantinuum LLC, Broomfield, CO (US)

(72) Inventors: Alexander Chernoguzov, Warrington, PA (US); Dominic Lucchetti, Lousville, CO (US); Nathaniel Burdick, Plymouth, MN (US); Matthew Swallows, Lafayette, CO (US); Paul Blanchard, Westminster, CO (US)

(73) Assignee: Quantinuum LLC, Broomfield, CO (US)

( * ) Notice: Subject to any disclaimer, the term of this patent is extended or adjusted under 35 U.S.C. 154(b) by 885 days.

(21) Appl. No.: 17/734,340

(22) Filed: May 2, 2022

(65) Prior Publication Data

US 2022/0398483 A1     Dec. 15, 2022

Related U.S. Application Data

(60) Provisional application No. 63/208,644, filed on Jun. 9, 2021.

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC ...................................................... G06N 10/40

(Continued)

(56) References Cited

U.S. PATENT DOCUMENTS

| | | | |
|---|---|---|---|
| 10,872,021 B1 | 12/2020 | Tezak et al. | |
| 2019/0049495 A1* | 2/2019 | Ofek ...................... | G06N 10/70 |
| 2019/0251478 A1 | 8/2019 | Bishop et al. | |

FOREIGN PATENT DOCUMENTS

| | | |
|---|---|---|
| JP | 2021-513135 A | 5/2021 |
| WO | 2019/232572 A1 | 12/2019 |

OTHER PUBLICATIONS

Messaoudi, Nizar, et al., "A Hardware-Accelerated Qubit Control System for Quantum Information Processing". Proceedings of 2020 XXXV Conference on Design of Circuits and Integrated Systems (DCIS), Nov. 18-20, 2020, 5 pages, IEEE, Spain.

(Continued)

*Primary Examiner* — Eric D Lee
(74) *Attorney, Agent, or Firm* — Alston & Bird LLP

(57) ABSTRACT

A quantum system controller configured to perform conditional transport with just-in-time waveform selection is provided. The quantum system controller comprises a processing device configured to generate a set of processed waveform files configured to cause a quantum processor of the quantum computer to perform a quantum circuit; cause the processed waveform files to be preloaded to one or more arbitrary waveform generators; and causing at least one signal to be provided to the one or more arbitrary waveform generators to execute at least one of the preloaded processed waveform files, wherein the signals provided to arbitrary waveform generators to execute at least one of the preloaded waveform files is in response to the quantum system controller evaluating a conditional operation. The signals provided to the arbitrary waveform generators allow for the just-in-time selection a waveform selection not on an expected path of the quantum circuit.

20 Claims, 12 Drawing Sheets

(58) Field of Classification Search
    USPC ........................................................ 716/104
    See application file for complete search history.

(56)                    References Cited

OTHER PUBLICATIONS

Outgoing—ISA/210—International Search Report Mailed on Sep. 27, 2022 for WO Application No. PCT/US22/032840.
Outgoing Written Opinion of the ISA Mailed on Sep. 27, 2022 for WO Application No. PCT/US22/032840.
Ryan, Colm A., et al., "Hardware for Dynamic Quantum Computing", dated Apr. 28, 2017, arxiv.org, Cornell University Library, retrieved from the Internet at <URL://https://arxiv.org/pdf/1704.08314v1.pdf>, on Feb. 1, 2023, 13 pages.
English Translation of JP Office Action dated Jan. 6, 2026 for JP Application No. 2022092983, 3 page(s).
JP Office Action Mailed on Jan. 6, 2026 for JP Application No. 2022092983, 4 page(s).

* cited by examiner

702 RESOLVE BLOCK(S) TO OPERATION(S)

704 RESOLVE OPERATION(S) TO SHARD(S)

706 CONVERT SHARD(S) TO QUBIT PLAN(S)

708 DETERMINE COST(S) FOR QUBIT PLAN(S)

710 OPTIMIZE ACCORDING TO QUBIT PLAN(S)

QUANTUM SYSTEM CONFIGURED FOR CONDITIONAL TRANSPORT WITH JUST-IN-TIME WAVEFORM SELECTION

CROSS-REFERENCE TO RELATED APPLICATION

This application claims the benefit of U.S. Provisional Application No. 63/208,644, filed Jun. 9, 2021, the entire contents of which is incorporated by reference herein.

TECHNICAL FIELD

Various embodiments relate to a quantum system controller for a quantum computer and methods relating thereto that enable conditional transport with just-in-time waveform selection. For example, some embodiments relate to a quantum system controller for a quantum computer that may be configured to perform conditional transport as well as just-in-time waveform selection and methods relating thereto.

BACKGROUND

Large-scale quantum computers are expected to solve problems that are currently intractable with today's technology. Solving such problems will entail computations employing quantum algorithms implemented using quantum circuits. The quantum algorithms require specific waveforms to be applied in one or more specific orders to implement a quantum circuit, and the implementation of a specific waveform may depend on the state of one or more qubits. Through applied effort, ingenuity, and innovation many deficiencies of prior quantum computer quantum system controllers and the configuration of quantum computer quantum system controllers to execute quantum algorithms have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for performing conditional transport with just-in-time waveform selection. For example, various embodiments provide methods, systems, apparatuses, computer program products, and/or the like for compiling quantum circuit, including determining an expected path of the quantum circuit when conditional states may be evaluated, optimizing the operations of a quantum circuit, selecting waveforms just-in-time when the evaluation of a condition results in branching away from the expected path, and merging back onto the expected path after branching off.

In an example embodiment, and according to an aspect of the present disclosure, a method comprises generating, by a processing device of a quantum system controller of a quantum computer, a set of processed waveform files configured to cause a quantum processor of the quantum computer to perform a quantum circuit; causing, by the processing device, the processed waveform files to be preloaded to one or more arbitrary waveform generators; and causing, by the processing device, at least one signal to be provided to the one or more arbitrary waveform generators to execute at least one of the preloaded processed waveform files, wherein the signals provided to arbitrary waveform generators to execute at least one of the preloaded waveform files is in response to the quantum system controller evaluating a conditional operation.

In an example embodiment, the method is further comprising: receiving, by the processing device and prior to the generation of the set of processed waveform files, one or more blocks; compiling, by the processing device, each of the one or more blocks into the quantum circuit; analyzing the quantum circuit for qubit placement; and determining an expected path for the quantum circuit based on at least the qubit placement.

In an example embodiment, the quantum circuit is comprised of one or more conditional operations, and wherein there is an expected path for the execution of the one or more conditional operations of the quantum circuit and wherein the response to the quantum system controller evaluating a conditional operation causes the execution of a waveform not on the expected path of the quantum circuit.

In an example embodiment, the method is further comprising causing, by the processing device, at least one second signal to be provided to the one or more arbitrary waveform generators to execute at least one of the preloaded waveform files to execute a merging operation to move to a position along the expected path.

In an example embodiment, the quantum circuit has been optimized to reduce a cost.

In an example embodiment, the cost is transport time.

In an example embodiment, the set of processed waveform files corresponds to an expected path of the quantum circuit.

In an example embodiment, generating the set of processed waveform files comprises: determining waveform files associated with the quantum circuit; receiving calibration data associated with the waveforms and the quantum circuit; and formatting the waveform files with the calibration data.

In an example embodiment, the calibration data includes a unique waveform ID.

In an example embodiment, the calibration data includes a playback speed.

In an example embodiment, and according to another aspect of the present disclosure, a quantum system controller comprising a processing device comprising at least one first processing element is provided. In an example embodiment, the first processing element is configured to: generate a set of processed waveform files configured to cause a quantum processor of the quantum computer to perform a quantum circuit; cause the processed waveform files to be preloaded to one or more arbitrary waveform generators; and cause at least one signal to be provided to the one or more arbitrary waveform generators to execute at least one of the preloaded waveform files, wherein the signals provided to arbitrary waveform generators to execute at least one of the preloaded waveform files is in response to the quantum system controller evaluating a conditional operation.

In an example embodiment, the first processing element is further configured to: receive, by the first processing element and prior to the generation of the set of processed waveform files, one or more blocks; compile, by the first processing element, each of the one or more blocks into the quantum circuit; and analyze the quantum circuit for qubit placement; and determine an expected path for the quantum circuit based on at least the qubit placement.

In an example embodiment, the quantum circuit is comprised of one or more conditional operations, wherein there is an expected path for the execution of the quantum circuit, and wherein the response to the quantum system controller evaluating a conditional operation causes the execution of a waveform not on the expected path of the quantum circuit.

In an example embodiment, the first processing element is further configured to: cause, by the processing device, at least one second signal to be provided to the one or more arbitrary waveform generators to execute at least one of the preloaded waveform files to execute a merging operation to move to a position along the expected path.

In an example embodiment, the quantum circuit has been optimized to reduce a cost.

In an example embodiment, the cost is transport time.

In an example embodiment, the set of processed waveform files corresponds to an expected path of the quantum circuit.

In an example embodiment, generating the set of processed waveform files comprises: determining waveform files associated with the quantum circuit; receiving calibration data associated with the waveforms and the quantum circuit; and formatting the waveform files with the calibration data.

In an example embodiment, the calibration data includes a unique waveform ID.

In an example embodiment, the calibration data includes a playback speed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a schematic diagram illustrating an example quantum computing system comprising a quantum system controller according an example embodiment.

FIG. 2 provides a schematic diagram of an example quantum system controller of a quantum computer.

FIG. 3 provides a schematic diagram of an example computing entity of a quantum computer system that may be used in accordance with an example embodiment.

FIGS. 6A, 6B, 6C, and 6D illustrate various processes, operations, and/or procedures performed to illustrate likely versus unlikely block handling according to various embodiments.

Figure 7:
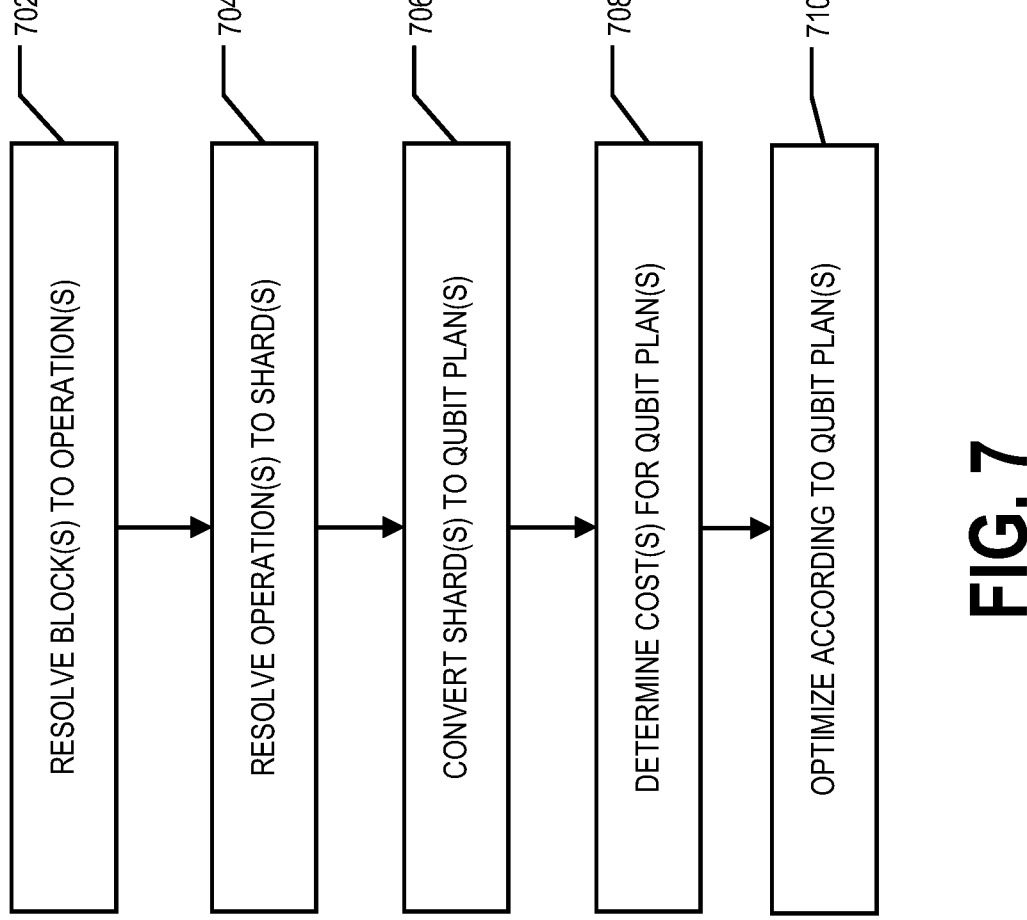

FIG. 7 is a flowchart illustrating various process, operations, and/or procedures performed by a quantum system controller, according to various embodiments.

Figure 8:
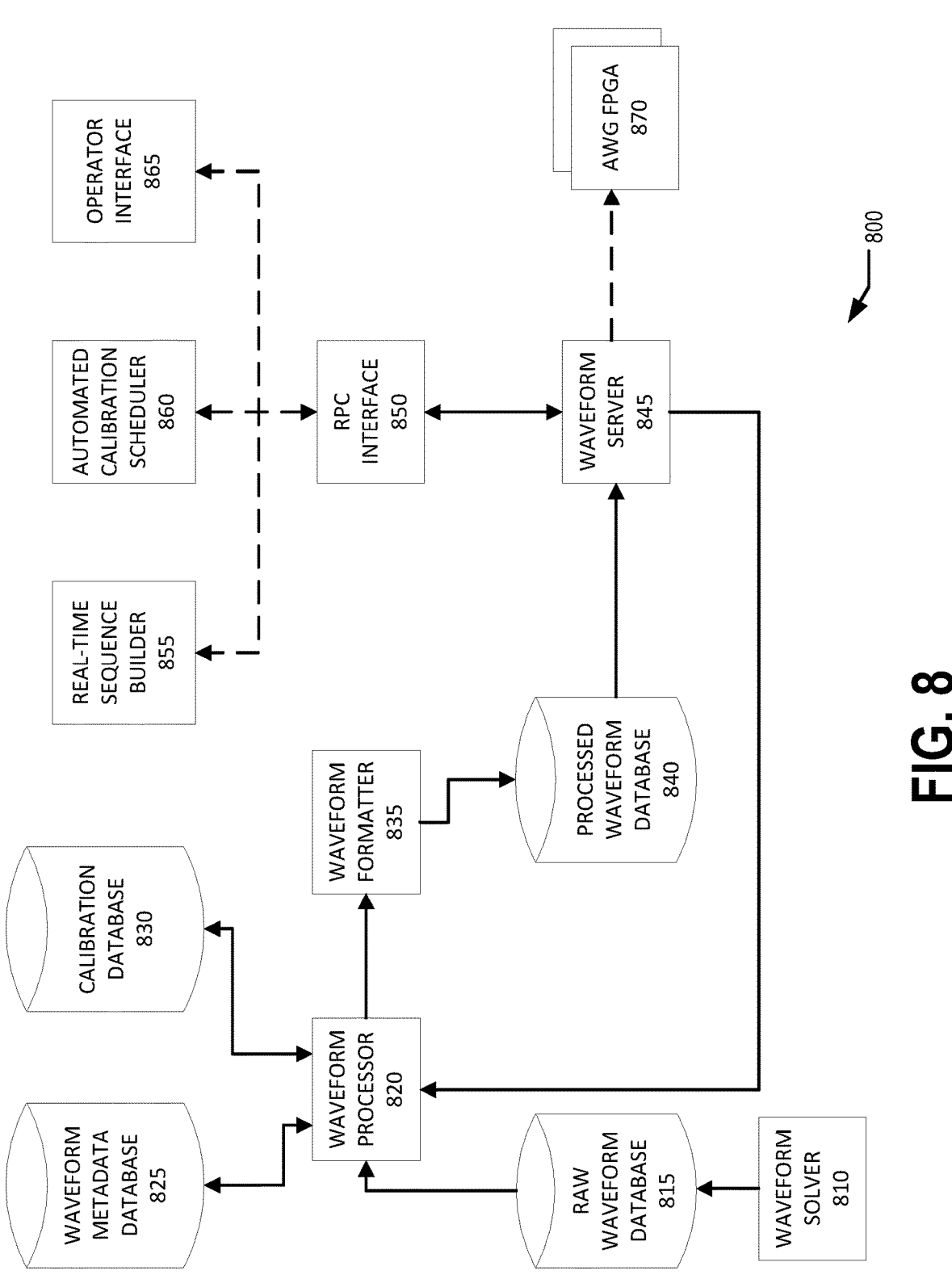

FIG. 8 provides a schematic diagram of an example waveform determination system of a quantum computer for an example embodiment.

Figure 9:
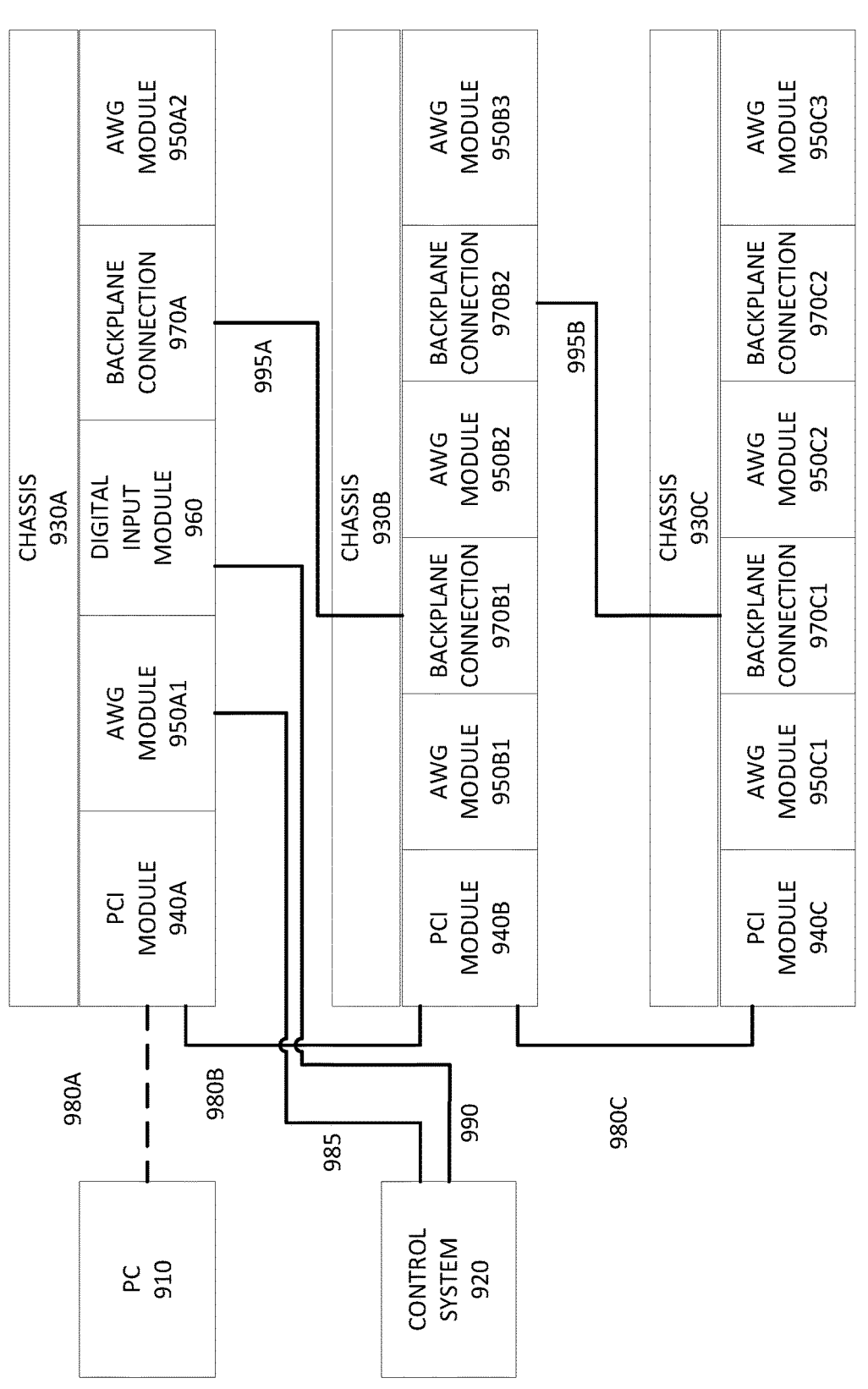

FIG. 9 provides a schematic diagram of an example hardware that may be used in accordance with an example embodiment.

Figure 10:
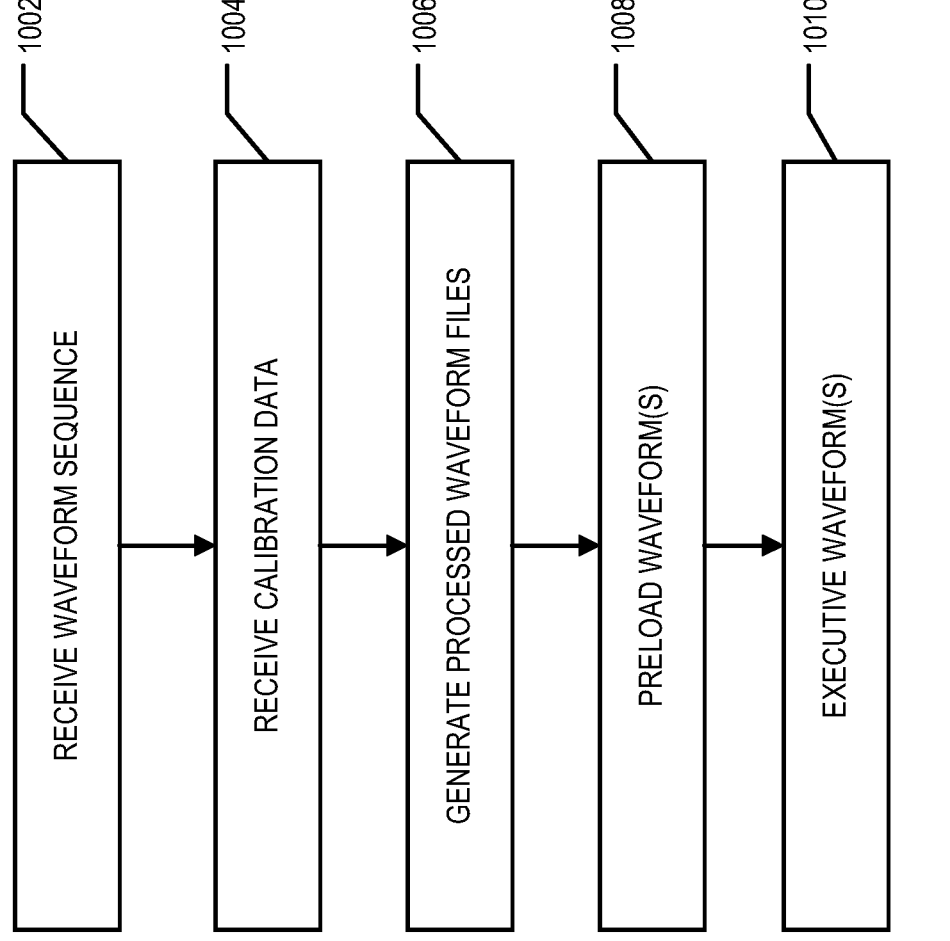

FIG. 10 provides a flowchart of processes, procedures, operations, and/or the like performed, for example, by a quantum system to execute waveforms according to various embodiments.

Figure 11:
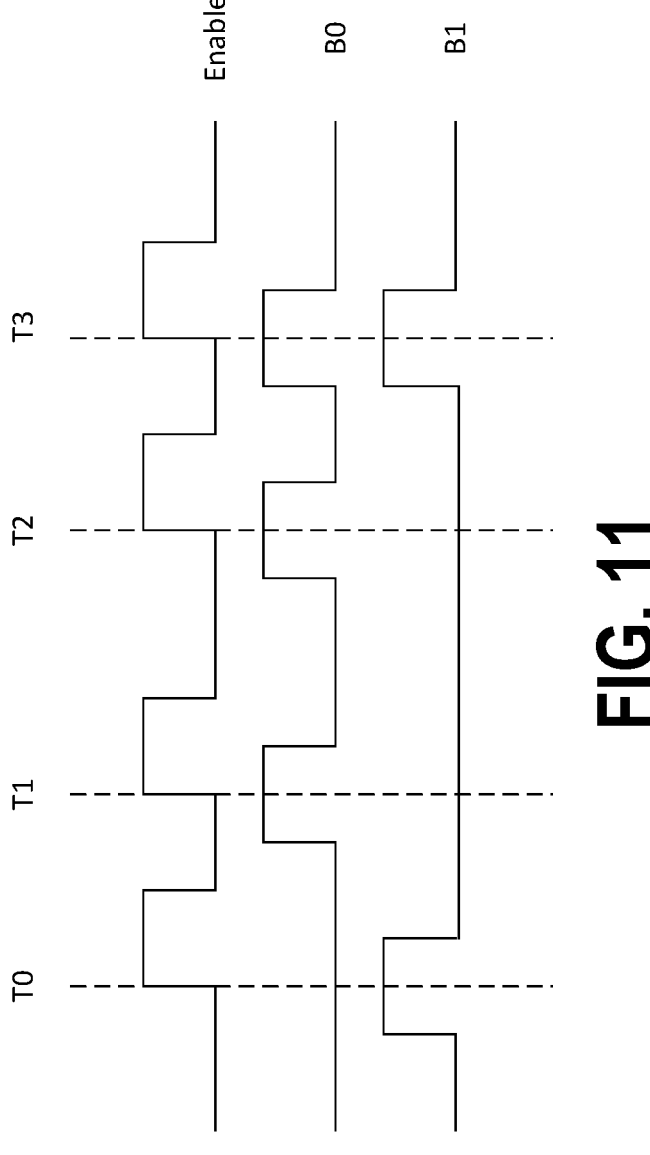

FIG. 11 illustrates a 6-bit trigger signal used by a quantum system controller with the exemplar hardware setup according to various embodiments.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

Example embodiments provide methods, systems, apparatuses, computer program products and/or the like for conditional transportation with just-in-time waveform selection, which may be in real-time or near real-time. For example, various embodiments provide methods, systems, apparatuses, computer program products, and/or the like for determining a quantum circuit and/or the transport functions required to perform a quantum circuit, including a path through the quantum circuit having expected operations being likely to occur as opposed to operations determined to be unlikely to occur. In various embodiments, the waveforms for the expected operations are determined ahead of time while the waveforms for unlikely operations are selected just-in-time, such as based on conditions in the ion trap, the quantum state of one or more ions confined within the ion trap, and/or the like.

In various embodiments, the quantum computing system 100 is based on a quantum charged-coupled device (QCCD) architecture. In a QCCD architecture, trapped-ion qubits are re-ordered and transported between different processing zones using dynamic electric fields generated by time-dependent voltages (hereafter referred to as waveforms) applied to control electrodes on the ion trap. In various embodiments, the waveforms selected to execute operations selected to be sent to the ion trap during operation of the quantum processor are not pre-programmed prior to the initiation of the quantum circuit but are, instead, selected and programmed just-in-time immediately before the waveform is output to the ion trap. In various embodiments, a waveform may be selected to minimize some cost, such as latency. The use of just-in-time waveform selection has several significant benefits as described herein, including but not limited to reducing circuit initialization time, reducing overall circuit runtime, eliminating unnecessary ion transport and therefore reducing the deleterious ion heating and quantum memory error associated with transport, and facilitating more complex circuits conditioned on qubit measurements performed during operation of the device.

In various embodiments, a user of the quantum system will provide code to execute on the quantum system. In various embodiments, the quantum system controller of the quantum computer comprises a classical and/or semiconductor-based processing device configured to generate or compile a series of operations as well as execute the operations. The code may be divided into one or more blocks, and the blocks may or may not depend on conditions to determine if a block of code will be executed by the quantum system. The quantum system may compile each block independently. In various embodiments, for example, a block may represent a conditional block of code or may represent a loop. The quantum system may merge blocks sharing the same conditions together or may merge blocks requiring the same operation(s) to be performed on one or more qubits together. The quantum system may also compile blocks to add transport operations to one or more qubits or to change the state of one or more qubits.

In various embodiments, a user may along with providing code provide, or separately provide, a weighting of how likely, or unlikely, it is that operations associated with portions of the code (e.g., blocks) will be executed. In various embodiments, a user may provide a flat rating that all blocks and or operations are equally likely to be executed. In various embodiments, a user may provide a preferred taken rating that certain conditions are assumed and related blocks and or operations are likely to be executed. In various embodiments, a user may provide a preferred untaken rating that certain conditions are assumed and related blocks and or operations rated unlikely are to be executed. In various embodiments a user may provide hint-weighting to provide how likely blocks or operations are to execute. In various embodiments, such weighting may be used to determine an expected overall cost associated with the execution of a likely path. In various embodiments, the weighting may alternatively be determined by simulation, modeling, or by analytical calculations. A simulation, model, or calculation may address the entirety of a quantum circuit to achieve full fidelity or may address one or more portions of the quantum circuit. Such simulations, models, or calculations may include analyzing and/or making determination based on the specific hardware to be used with the quantum circuit. In some embodiments, a simulation, model, or calculation may be performed locally, such as by the quantum computing system 100, or may be performed remotely with output provided to the quantum computing system 100.

In various embodiments, the results of the weighting may be used to determine an expected path as well as select related operations and/or related waveforms. Unplanned branches may be recursively addressed such that the unplanned branch of operations branch from an initial-branch point to re-join point. The initial-branch point may be related to a specific qubit configuration. The re-join point may also be related to a specific qubit configuration, which may or may not be the same as the initial-branch point.

In various embodiments, after an expected path has been identified, optimization may occur. In various embodiments, and as discussed herein, the execution of a block, an operation, or a shard may involve ordering qubits in the trap in a specific manner, gating one or more qubits, transporting qubits to a specific location, or performing an operation on one or more qubits. In various embodiments optimization may include, but is not limited to, merging multiple conditional paths, replicating a conditional or unconditional block or operation on multiple paths, moving transport within a loop outside of a loop, including allowing a branch or re-join point to be more efficient, or any combination of the foregoing. Such optimization may allow, for example, the execution of an operation with waveform(s) sent to the trap to be performed once instead of with the sending of multiple waveforms, which may (or may not) be at multiple time periods.

Exemplary Quantum Computing System

Figure 1:
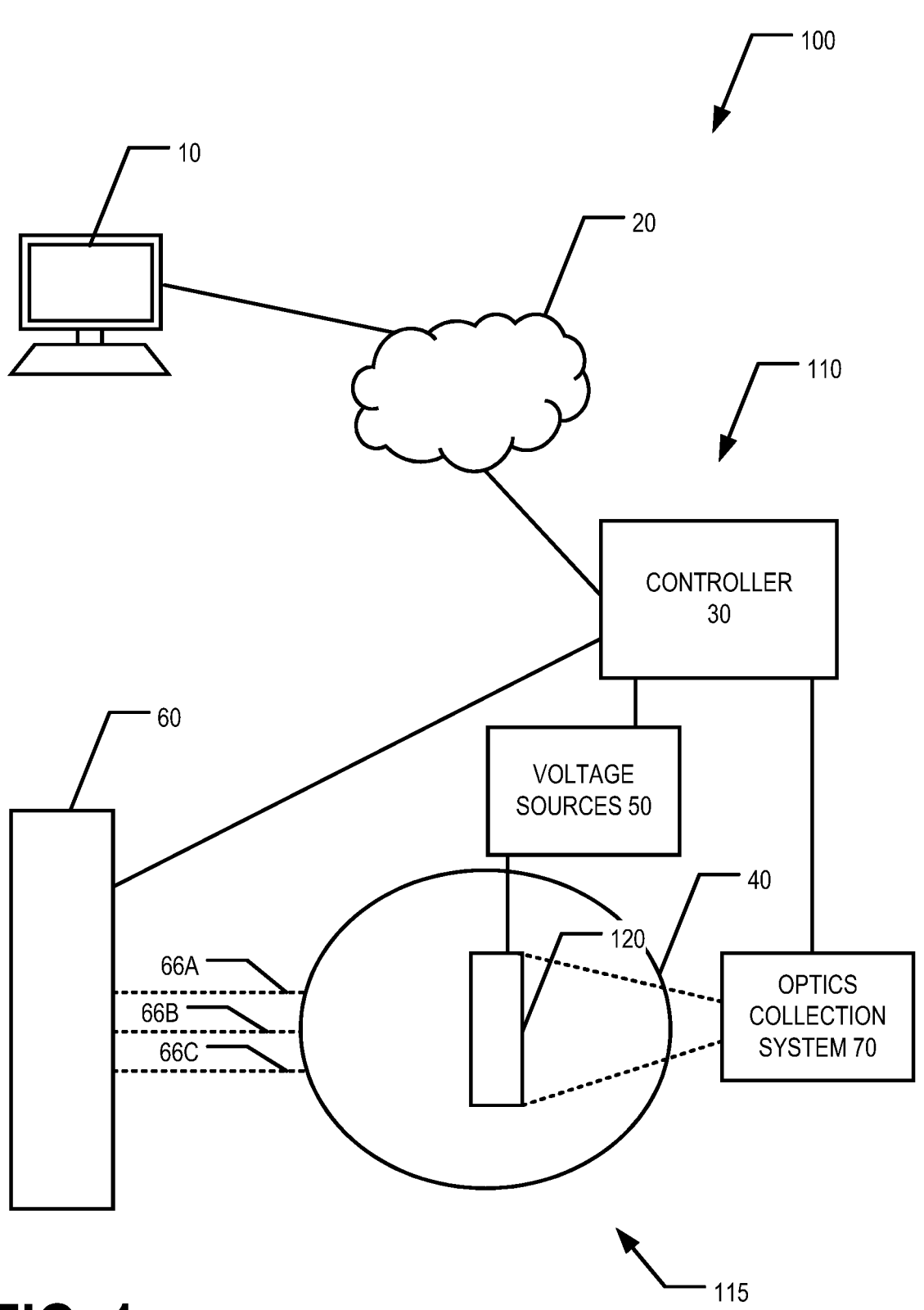

FIG. 1 provides a schematic diagram of an example quantum computing system 100 where the quantum processor comprises an atomic object confinement apparatus 120 (e.g., an ion trap and/or the like) having a plurality of atomic objects (e.g., atoms, ions, and/or the like) confined therein, in accordance with an example embodiment. In various embodiments, the quantum computing system 100 comprises a computing entity 10 and a quantum computer 110. In various embodiments, the quantum computer 110 comprises a quantum system controller 30 and a quantum processor 115. In various embodiments, the quantum system controller 30 is configured, programmed, and/or the like to control the quantum processor 115. In an example embodiment, the quantum processor 115 comprises a plurality of qubits (e.g., data qubits that may be organized into logical qubits, ancilla qubits, and/or the like). In various embodiments, the quantum computer 110 includes or communicates with databases (not shown) described herein. For example, the databases may be stored by one or more computing entities 10 that are in communication with the controller 30 via one or more wired and/or wireless networks 20 and/or stored by memory local to the controller 30.

In various embodiments, the quantum processor 115 comprises means for controlling the evolution of quantum states of the qubits. For example, in an example embodiment, the quantum processor 115 comprises a cryostat and/or vacuum chamber 40 enclosing a confinement apparatus 120 (e.g., an ion trap), one or more manipulation sources 60, one or more voltage sources 50, and/or one or more optics collection systems 70. For example, the cryostat and/or vacuum chamber 40 may be a temperature and/or pressure-controlled chamber. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within the confinement apparatus. In various embodiments, the atomic objects within the atomic confinement apparatus (e.g., ions trapped within an ion trap) act as the data qubits and/or ancilla qubits of the quantum processor 115 of the quantum computer 110. For example, in an example embodiment, wherein the one or more manipulation sources 60 comprise one or more lasers, the lasers may provide one or more laser beams to atomic objects trapped within the confinement apparatus 120 within the cryostat and/or vacuum chamber 40. For example, the manipulation sources 60 may generate and/or provide laser beams configured to ionize atomic objects, initialize atomic objects within the defined two state qubit space of the quantum processor, perform gates one or more qubits of the quantum processor, read a quantum state of one or more qubits of the quantum processor, and/or the like.

In various embodiments, the quantum computer 110 comprises an optics collection system 70 configured to collect and/or detect photons generated by qubits (e.g., during reading procedures). The optics collection system 70 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer 110. In various embodiments, the detectors may be in electronic communication with the quantum system controller 30 via one or more A/D converters 525 (see FIG. 2) and/or the like.

In various embodiments, the quantum computer 110 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 120, in an example embodiment. Varying the electrical potential(s) may move the ions between locations or states. In various embodiments, how to vary the electrical potential(s) may be defined by waveforms that specify one or more voltages to apply over a period of time.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the quantum system controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the quantum system controller 30 can understand and/or implement. For example, the controller 30 is configured to generate machine code level commands configured to, when executed by the appropriate components of the quantum computer 110, cause the performance of a quantum circuit by the quantum computer 110. In various embodiments the computing entity 10 may provide quantum computing algorithms and/or circuits in a computing language that the quantum system controller 30 resolves into operations and shards (e.g., individual or sets of machine code level commands), which is discussed further below.

In various embodiments, the quantum system controller 30 is configured to control the voltage sources 50, cryostat system and/or vacuum system controlling the temperature and pressure within the cryostat and/or vacuum chamber 40, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the confinement apparatus. For example, the quantum system controller 30 may cause a controlled evolution of quantum states of one or more atomic objects within the confinement apparatus to execute a quantum circuit and/or algorithm. For example, the quantum system controller 30 may cause a reading procedure comprising coherent shelving to be performed, possibly as part of executing a quantum circuit and/or algorithm. Additionally, the quantum system controller 30 is configured to communicate and/or receive input data from the optics collection system 70 and corresponding to the reading of the quantum state of qubits of the quantum computer 110. In various embodiments, the atomic objects confined within the confinement apparatus are used as qubits of the quantum computer 110.

Exemplary Quantum System Controller

In various embodiments, a quantum computer 110 comprises a quantum system controller 30 and a quantum controller 115. The quantum system controller 30 is configured to control various components of a quantum processor 115. For example, various embodiments are configured to perform one or more quantum error corrections for one or more data qubits in real-time and/or near real-time with respect to the occurrence of one or more quantum errors experienced by the one or more data qubits, which may be evaluated as a conditional block.

In various embodiments, the quantum system controller 30 is in communication with an optics collection system 70 such that the quantum system controller 30 is configured to receive input data captured and/or generated by the optics collection system 70. The quantum system controller 30 is further configured to perform quantum error correction via a software-based correction and/or via the physical application of a quantum error correction to one or more qubits (e.g., by controlling of one or more voltage sources 50 and/or manipulation sources 60). In various embodiments, the quantum system controller 30 is further configured to control a cryostat system and/or vacuum system controlling the temperature and pressure within the cryostat and/or vacuum chamber 40, cooling system, and/or other systems controlling the environmental conditions (e.g., temperature, humidity, pressure, and/or the like) within the cryostat and/or vacuum chamber 40.

Figure 2:
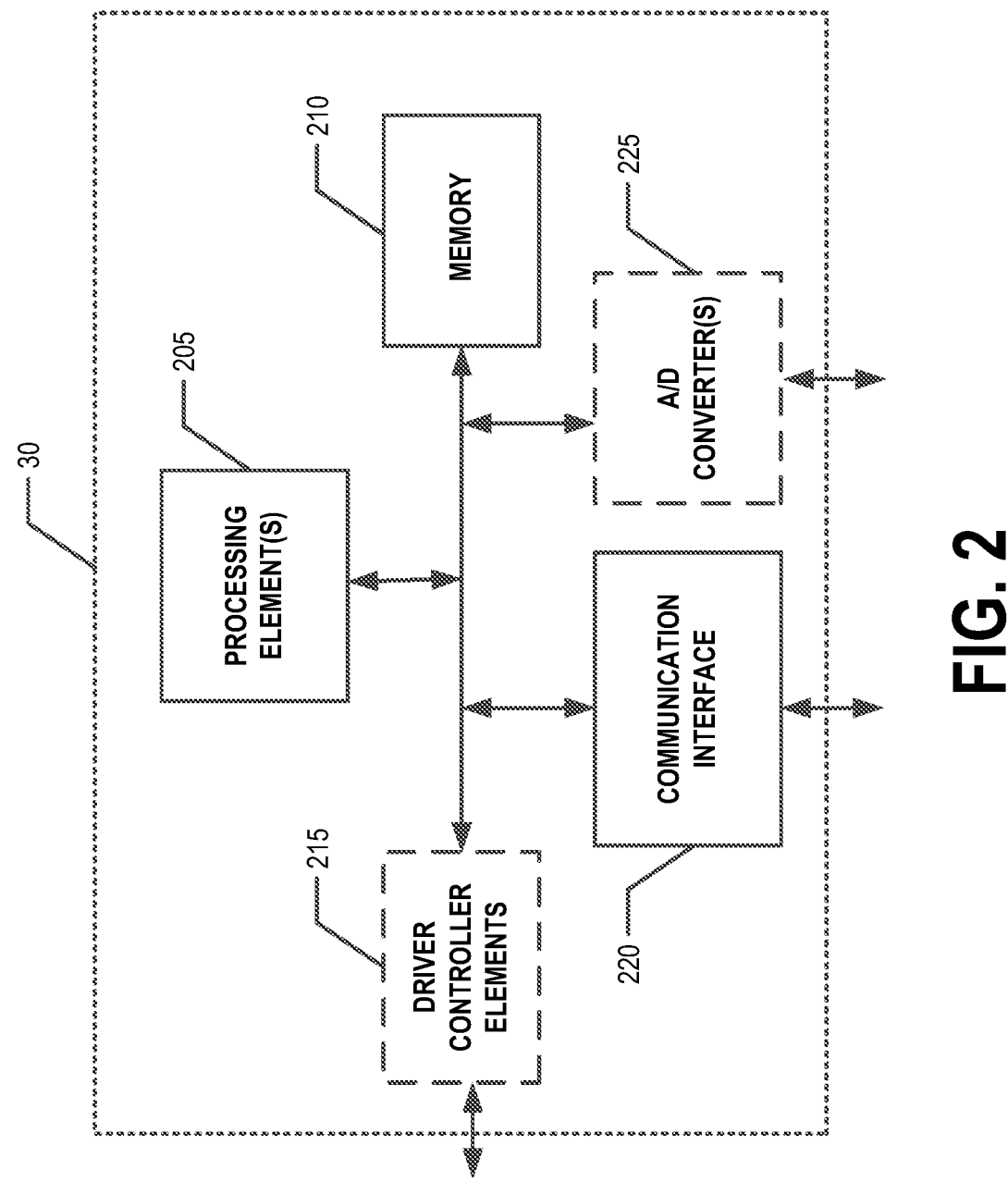

As shown in FIG. 2, in various embodiments, the quantum system controller 30 may comprise various quantum system controller elements including processing devices 205, memory 210, driver controller elements 215, a communication interface 220, analog-digital (A/D) converter elements 225, and/or the like. In various embodiments, the quantum system controller 30 is configured to receive input data generated by the optics collection system via the A/D converter(s) 225. In various embodiments, the processing device(s) 205 are configured to operate as described herein. In various embodiments, the quantum system controller 30 may include additional quantum system controller elements as described herein, such as the waveform determination system 800 shown in FIG. 8.

In various embodiments, the processing devices 205 comprise processing elements such as programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing elements and/or circuitry, and/or the like. The term circuitry may refer to an entirely hardware embodiment or a combination of hardware and computer program products. In an example embodiment, a processing device 205 of the quantum system controller 30 comprises a clock and/or is in communication with a clock.

In various embodiments, the memory 210 comprises non-transitory memory such as volatile and/or non-volatile memory storage such as one or more of hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 210 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized quantum system controller language(s), and/or the like), and/or the like. In an example embodiment, execution of at least a portion of the computer program code stored in the memory 210 (e.g., by a processing device 205) causes the quantum system controller 30 to perform one or more steps, operations, processes, procedures and/or the like for generating one or more sets of commands configured to cause the quantum processor 115 to perform at least a portion of a quantum circuit; to update one or more qubit registries; and/or the like. In an example embodiment, execution of at least a portion of the computer program code stored in the memory 210 causes the quantum system controller 30 to cause one or more commands to be performed.

In various embodiments, the driver quantum system controller elements 215 include one or more drivers and/or quantum system controller elements each configured to control one or more drivers. In various embodiments, the driver quantum system controller elements 215 may comprise drivers and/or driver controllers. For example, the driver controllers may be configured to cause one or more corresponding drivers to be operated in accordance with executable instructions, commands, and/or the like generated, scheduled. and executed by the quantum system controller 30. For example, the processing device 205 may generate one or more commands to be performed by a first driver.

In various embodiments, the driver controller elements 215 enable the quantum system controller 30 to operate a voltage sources 50, manipulation sources 60, cooling system, vacuum systems, and/or the like. In various embodiments, the drivers may be laser drivers (e.g., configured to operate and/or control one or more manipulation sources 60); vacuum component drivers; drivers for controlling the flow of current and/or voltage applied to electrodes (e.g., configured to operate and/or control one or more voltage sources 50) used for maintaining and/or controlling the trapping potential of the confinement apparatus 120 (and/or other drivers for providing driver action sequences to potential generating elements of the confinement apparatus); cryostat and/or vacuum system component drivers; cooling system drivers, and/or the like.

Each driver controller element 215 corresponds to an endpoint within the system (e.g., a component of a manipulation source 60, a component of a voltage source 50 (radio frequency voltage sources, arbitrary waveform generators (AWG), direct digital synthesizer (DDS), and/or other waveform generator), a component of a cooling and/or vacuum system, a component of the optics collection system 70, and/or the like). Each endpoint within the quantum computer 110 represents an individual hardware control. Each endpoint has its own set of accepted micro-commands, in various embodiments. Examples include but are not limited to a voltage source 50 such as a direct digital synthesizer (DDS), component of an optics collection system 70 such as a photomultiplier tube (PMT), a component of a manipulation source 60 such as a laser driver and/or optical modulator switch, and/or general-purpose output (GPO). Individual commands for a DDS allow for setting power level, frequency and phase of a controlling signal generated thereby. Commands for a PMT interface include start/stop photon count and reset of count, in various embodiments. Commands for a GPO endpoint include setting and/or clearing one or more output lines. These output lines can be used to control external hardware in a manner synchronized with the quantum circuit execution.

In various embodiments, the quantum system controller 30 comprises means for communicating and/or receiving signals from one or more optical receiver components (e.g., of the optics collection system 70). For example, the quantum system controller 30 may comprise one or more analog-digital (A/D) converter elements 225 configured to receive signals from one or more optical receiver components (e.g., a photodetector of the optics collection system 70), calibration sensors, and/or the like. In various embodiments, the A/D converter elements 225 are configured to write the input data generated by converting the received signals generated by one or more optical receiver components of the optics collection system 70 to memory 210.

In various embodiments, the quantum system controller 30 may comprise a communication interface 220 for interfacing and/or communicating with, for example, a computing entity 10. For example, the quantum system controller 30 may comprise a communication interface 220 for receiving executable instructions, command sets, and/or the like from the computing entity 10 and providing output received from the quantum computer 110 (e.g., from an optics collection system 70) and/or the result of a processing the output to the computing entity 10. In various embodiments, the computing entity 10 and the quantum system controller 30 may communicate via a direct wired and/or wireless connection and/or via one or more wired and/or wireless networks 20.

Exemplary Computing Entity

Figure 3:
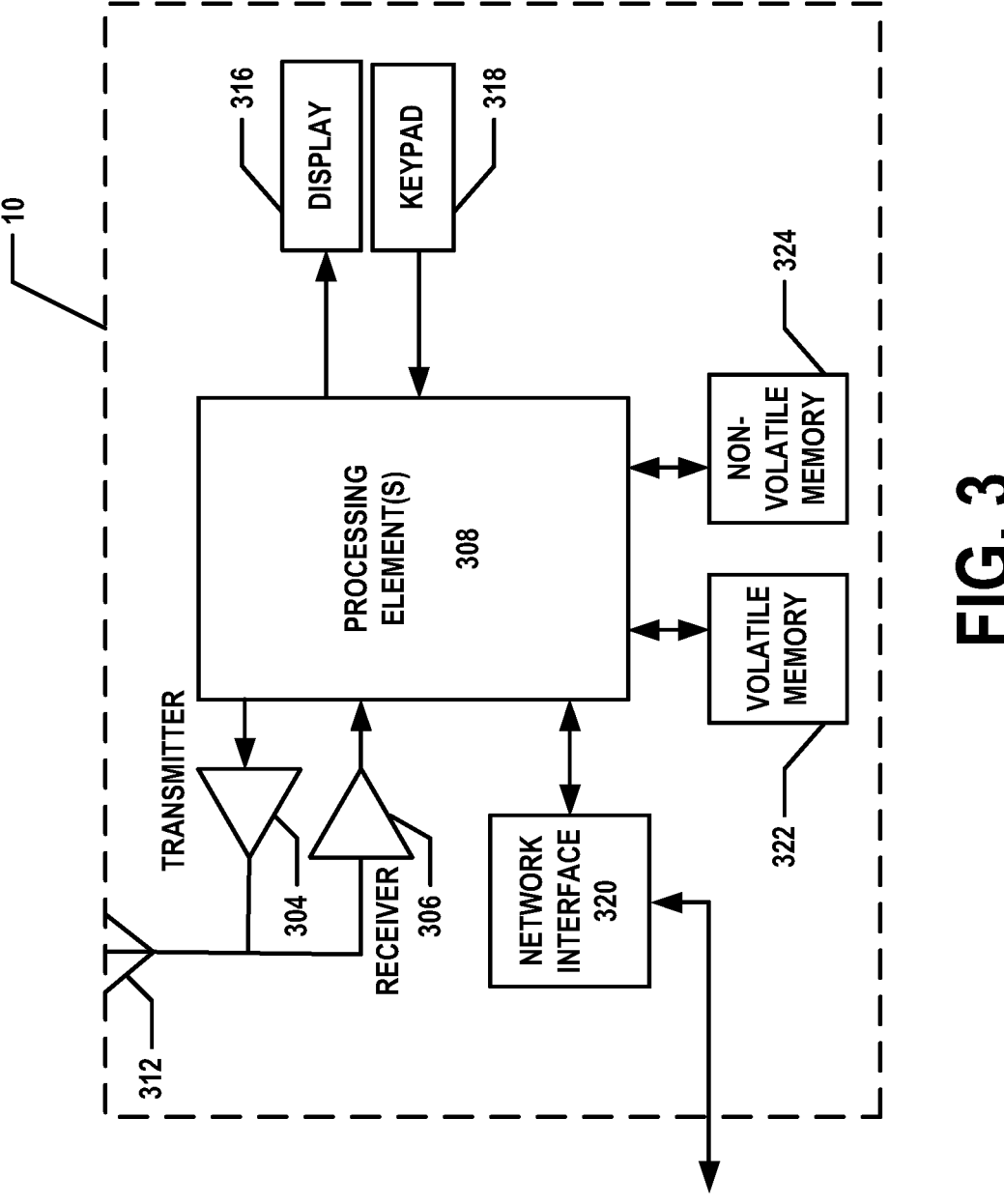

FIG. 3 provides an illustrative schematic representative of an example computing entity 10 that can be used in conjunction with embodiments of the present disclosure. In various embodiments, a computing entity 10 is a classical (e.g., semiconductor-based) computer configured to allow a user to provide input to the quantum computer 110 (e.g., via a user interface of the computing entity 10) and receive, display, analyze, and/or the like output from the quantum computer 110.

As shown in FIG. 3, a computing entity 10 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a quantum system controller 30, other computing entities 10, and/or the like. The computing entity 10 can include a network interface 320, which may provide signals to and receive signals in accordance with an interface standard of applicable network systems to communicate with various entities, such as a quantum system controller 30, other computing entities 10, and/or the like.

In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 322 and/or non-volatile storage or memory 324, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Exemplary Operation of a Conditional Branch Handling

In various embodiments, the quantum system controller 30 is configured to control the operation of the quantum computer 110. For example, the quantum system controller 30 is configured to control the performance of operations by the quantum processor 115 to cause the quantum processor to perform one or more quantum computations via the performance of one or more quantum circuits. For program flow-control it is advantageous for the quantum system controller 30 to be able to control the application of gates and update of a classical state of the quantum processor, one or more qubits, and/or the like. Thus, in various embodiments, the control flow is handled, at least in part, through the real-time or near real-time control mechanisms of the quantum system controller 30. In various embodiments, this enables analysis of conditional statements that may cause conditional branches resulting in just-in-time waveform selection to address the branches.

Figure 4:
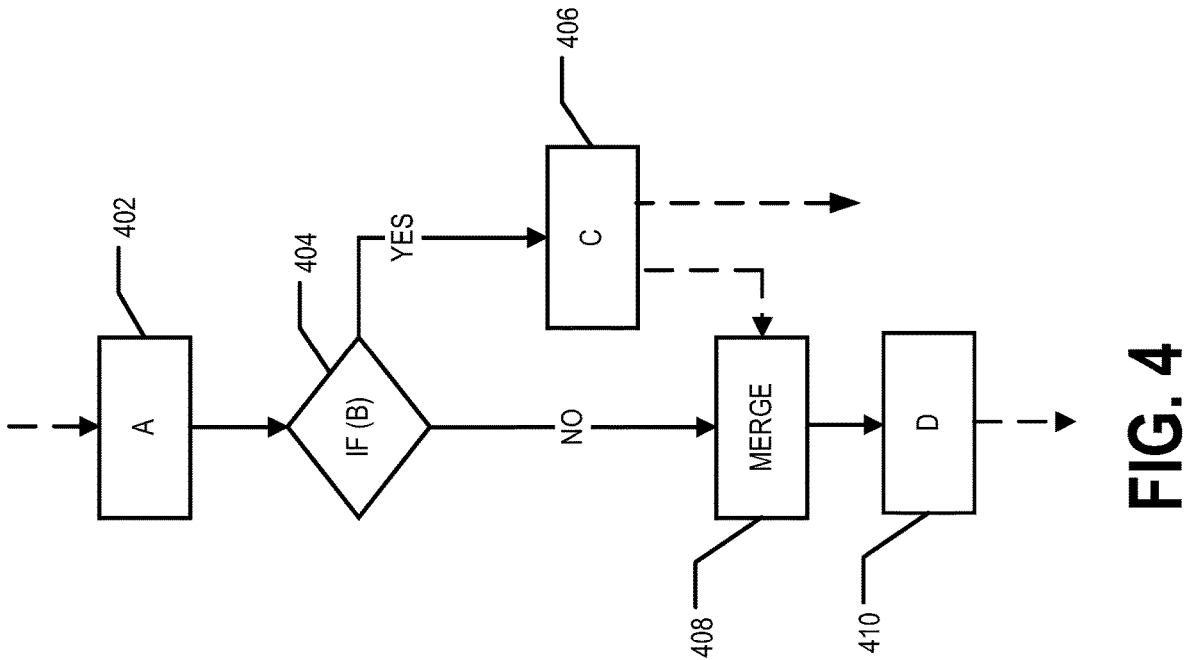
FIG. 4 is a flowchart illustrating various processes, operations, and/or procedures performed by a quantum system controller to address a conditional operation according to various embodiments.
Figure 5:
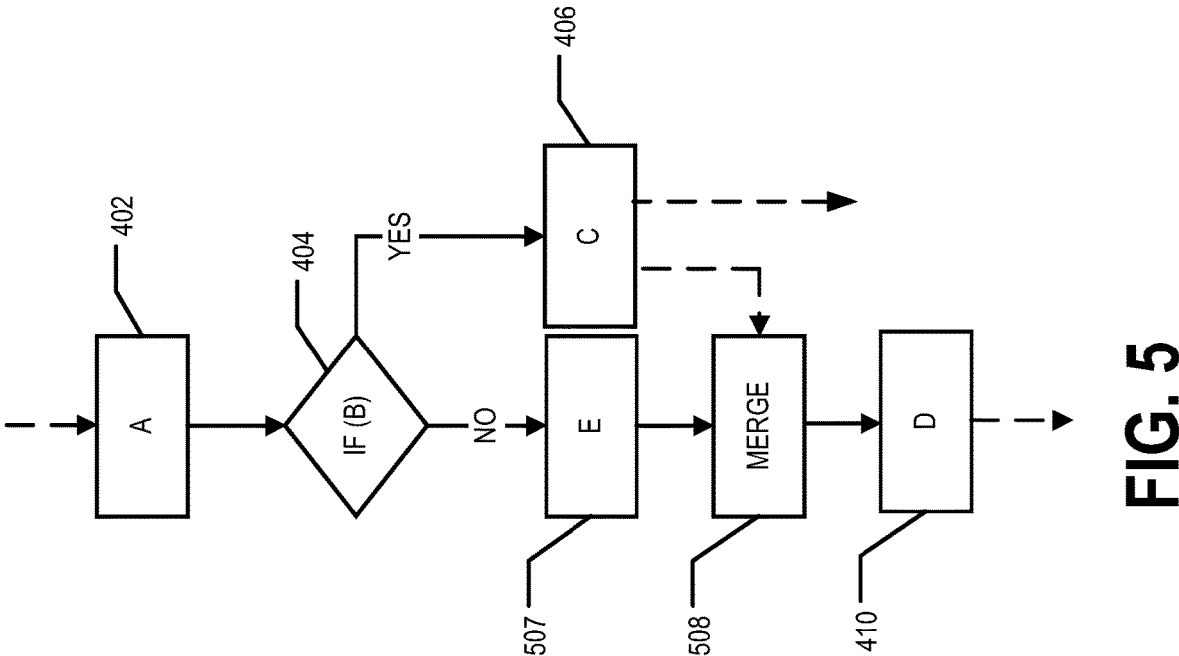
FIG. 5 is a flowchart illustrating various processes, operations, and/or procedures performed by a quantum system controller to address a conditional operation according to various embodiments.

In various embodiments, to enable the real-time or near real-time control flow to handle conditional branches, measurements of the state of the trap are taken and used as inputs to determine if a condition is met. An example of a condition may be if the qubits in the trap are in a certain state, in a certain order, or a combination of each. Depending on the state of the qubits, the quantum system controller 30 may be configured to execute at least one of a plurality of operations. The addressing of which operation to execute may result in a quantum circuit operating according to an expected path or take a branch, which is illustrated in FIGS. 4 and 5, discussed below. As discussed herein, a branch may include expected operations, may not include expected operations, or may include a mix of each.

In various embodiments, the quantum system controller 30 may cause the quantum processor 115 to perform a first portion of a quantum circuit by generating and executing a first operation or set of operations. Input data may then be processed to make one or more decisions based on the input value, which is referred to as a condition, which may results in a determination regarding a next operation(s) to be executed.

FIG. 4 is a flowchart illustrating various processes, operations, and/or procedures performed by a quantum system controller to address a conditional operation according to various embodiments. The embodiment of FIG. 4 illustrates an example of processing input data by the quantum system controller 30 to determine whether to execute conditional operations.

Starting at step/operation 402, operation A is executed by the quantum system controller 30 and/or driver controller elements 215 thereof. While not depicted, there may be multiple operations that occur before reaching step/operations 404. The execution of operation A causes the quantum processor 115 to at least perform a first portion of the quantum circuit.

At step/operation 404, input data is processed and a determination is made based on the processing of the input data to determine if conditional operations will be executed. In other words, step/operation 404 is a conditional execution point where the next steps to be performed by the quantum computer are determined in real-time or near real-time during run-time with respect to the execution of the quantum circuit by the quantum computer. For example, the processing device 205 of the quantum system controller 30 processes input data indicating a quantum state of one or more qubits as a result the performance of the first portion of the quantum circuit (e.g., operation A). This input data may be the state of one or more qubits in the trap. At step/operation 404, a determination is made as a function of the input data and/or the processing thereof. For example, a conditional B which takes the input data as input thereto and/or as a variable thereof is evaluated to determine a conditional result. When the conditional B evaluates to yes or true, the process continues to step/operation 406. When the conditional B evaluates to no or false, the process continues to step/operation 408. While step/operation 404 illustrates conditional B in the singular, conditional B may evaluate multiple input data. For example, multiple input data related to one or more qubits may be used to make the determination of conditional B. Further, while conditional B is illustrated in FIG. 4 as going either to step/operation 406 or step/operation 408, the conditional may allow for more than two choices (not depicted in FIG. 4).

As illustrated in FIG. 4, if conditional B is true then at step/operation 406, the processing device 205 executes conditional operation C. While depicted as operation C, step/operation 406 may include one or more operations to be performed by processing device 205. In one example, the operation C may include one or more commands configured to cause a qubit to be acted on via application of a manipulation signal, for example, to the qubit. The process may then continue to step/operation 408 or may follow a different path, such as in an embodiment where another conditional is determined.

At step/operation 408, the processing device 205 may execute operations to cause a state transition to merge one or more qubits to an expected state. The operations to merge the one or more qubits may, for example, include operations to change the location of the qubits or to change the ordering of the qubits to place the one or more qubits into an expected state.

As discussed herein, various embodiments may have an expected path for branch handling associated with how likely a conditional operation is to be executed. In various embodiments, and as discussed herein, waveforms may be preloaded for execution that are specific to the state of the one or more qubits. In order for the preloaded waveforms to be used to successfully execute a planned quantum circuit the one or more qubits need to be in their expected states.

In the embodiment illustrate in FIG. 4, and in an embodiment with an expected path of conditional B being no or false, the expected path may be expecting a specific state of the one or more qubits after execution of operation A at step/operation 402 but prior to operation D at step/operation 410. In this embodiment, the expected path of the quantum circuit may be through operation A and then through operation D. The execution of these operations may expect the one or more qubits to be in a specific state before and after each operation, which may not occur when operation C is executed. In embodiments where only the operations of the expected path are executed (i.e., the conditional is no or false), the one or more qubits are in the expected state and no merge step/operation 408 needs to be executed.

In an alternative embodiment, the conditional B may be evaluated as yes or true and operation C is executed, which is an operation off the expected path. The execution of operation C may cause the one or more qubits to be in a different state that if operation C would not have been executed. To return the one or more qubits to the expected state going into operation D, the merge step/operation 408 may need to be executed. As this branch is off the expected path, some embodiments may have the waveform selection may occur just-in-time to select the waveform associated with operation C and/or the merge step/operation 408. After execution of the merge step/operation 408, the state of the one or more qubits will be in the expected state and step/operation 410 may be executed as expected.

At step/operation 410, the processing device 205 executes operation D. While depicted as operation D, step/operation 410 may include one or more operations to be performed by processing device 205.

FIG. 5 is a flowchart illustrating various processes, operations, and/or procedures performed by a quantum system controller to address a conditional operation according to various embodiments. FIG. 5 differs from FIG. 4 in that, among other things, operation E at step/operation 507 occurs if conditional B is no or false. The execution of operation E may result in the state one or more qubits to be in a different state than operation C.

At step/operation 404, input data is processed and a determination is made whether conditional B is yes or no. In FIG. 5, regardless of the determination of the conditional, an operation will be executed—either operation C at step/operation 406 or operation E at step/operation 507. The expected path may consist of operations A, E, and D or of operations A, C, and D. If the expected path is not taken, as discussed herein, the state of the one or more qubits may not be as expected prior to operation D at step/operation 410, which may require operations to merge the one or more qubits into the expected state.

As discussed herein, various embodiments may have an expected path for branch handling associated with how likely a conditional operation is to be executed. In various embodiments, and as discussed herein, waveforms may be preloaded for execution that are specific to the state of the one or more qubits. In order for the preloaded waveforms to be used to successfully execute a planned quantum circuit the one or more qubits need to be in their expected states.

In embodiments where the expected path expects the conditional to be no or false (e.g., the branch is not taken), the use of a merge step/operation may be referred to as a branch-back implication, which refers to the one or more qubits being brought back into an excepted state as if the operations in the branch had not been executed.

In embodiments where the expected path expects the conditional to be yes or true (e.g., the branch is taken), the use of a merge step/operation may be referred to as a branch-forward implication, which refers to the one or more qubits being brought forward into an excepted state as if the operations in the branch had been executed.

In embodiments using either a branch-back implication or a branch-forward implication, the one or more qubits are brought into an expected state such that operations occurring after the conditional operation(s) may be executed as expected.

Exemplary Operation of a Likely Versus Unlikely Block Handling

In various embodiments the quantum system controller 30 is configured to compile the code describing the quantum circuit. In various embodiments the code may include blocks of operations (referred to herein as "blocks") that are compiled such that waveforms to be applied to the trap electrodes may be determined. In various embodiments, at compiling, the code may be divided into one or more blocks, and the blocks may or may not depend on conditions to determine if a block of code will be executed by the quantum system. The quantum system may compile each block independently. Blocks sharing the same conditions may be merged, which may be referred to as opportunistic merging. In various embodiments, for example, a block may represent a conditional block of code may represent a loop. The quantum system may merge blocks sharing the same conditions together or may merge blocks requiring the same operation(s) to be performed on one or more qubits together. The compilation of blocks, such as due to the condition(s) of input data, may create branches that may or may not be taken depending on the condition. The quantum system may also compile blocks to add transport operations to one or more qubits or to change the state of one or more qubits.

In various embodiments the blocks may be converted into their individual operations. Then the individual operations may be converted into shards (e.g., individual and/or sets of machine code level commands), which may be schedulable units of operations providing for a specific operation to be performed on one or more specific qubits. In various embodiments, these schedulable of units of operations may be used with determining a starting state for one or more qubits, an ending state for one or more qubits, and/or a waveform to apply, including how long to apply the waveform. In various embodiments the shards are re-orderable depending on the one or more qubits an operation is being performed on and when an operation is scheduled. In various embodiments the shards may be analyzed to determine a planned location and state of one or more qubits before and after execution of each shard of the quantum circuit. In various embodiments, when the shards comprising a quantum circuit have been determined, the various operations to be performed on qubits according to the schedule of the shards may be optimized to minimize some cost. Costs may be analyzed as, among other things, transport time, noise, heat, error estimates, fidelity, or a combination of any of the foregoing. In an example embodiment using transport time as a cost, each transport operation required to move a qubit for a gating operation may require one or more waveforms to be applied for the qubit to be in an expected state to allow for the gating, and each waveform may be associated with a transport cost. In such an embodiment, if operations or shards may be reordered or rearranged to minimize the number of waveforms applied to accomplish moving qubits to the expected state, the transport cost may have been reduced or minimized. The waveforms selected in such a minimization, in some embodiments, may also be selected based on the offset values associated with the processed waveform files as discussed herein. Optimization may be performed merging, splitting, or reordering operations applied to the electrodes via waveforms.

The blocks, operations, and shards may be conditional depending on the value of an input datum, such a measurement related to one or more qubit. As discussed herein, the likelihood of a condition being true or false may be predicted as, among other things likely, unlikely, or flat. In various embodiments the likelihood (or unlikelihood) may be assigned a numerical value, such as on a scale of 0 to 100%. The optimization may incorporate the assignment of the likelihood (or unlikelihood) of a block, operation, or condition to occur during optimization. Additionally, in various embodiments, the condition may be loop that requires a block, operation, or shard to repeat (e.g., loop) two or more times, and such a condition may result in the condition of a loop to be assigned a cost that is a multiple (e.g., 2, 3, 4 . . . ) of a cost otherwise associated with the related block, operations, or shards. In some embodiments, the multiple of a cost may be due to a loop requiring one or more transport operations to be executed during each pass through the loop. The optimization may result in the determination of an expected path. As discussed herein, various embodiment have the quantum circuit determined based on the expected path of likely operations that may be optimized to minimize a cost. The expected path may branch away from unlikely branches. In various embodiments, should an unlikely branch off of the expected path be taken, the quantum system controller 30 may select and execute a just-in-time waveform to take the unlikely branch. The quantum system controller 30 may also cause any deviation from an expected state caused by taking the unlikely branch to be addressed with a merging operation that returns the one or more qubits to their expected state before continuing down the expected path.

In various embodiments, the determination of the quantum circuit will also validate that the expected path may be executed without causing an error. This may include determining that all of the waveforms applied to execute operations will allow a quantum circuit to be executed in the specific execution flow required to complete the quantum circuit. If a condition is evaluated that causes the quantum circuit to branch off from the expected path, the quantum system controller 30 may perform the operations related to the branch and then, as discussed herein, execute operations causing the one or more qubits to merge to an expected state of where the branch taken began such that the expected path may be continued. In such embodiments, the validation of only the expected path will allow for the conservation of quantum computing system 100 resources during compilation.

Figures 6A, 6B:
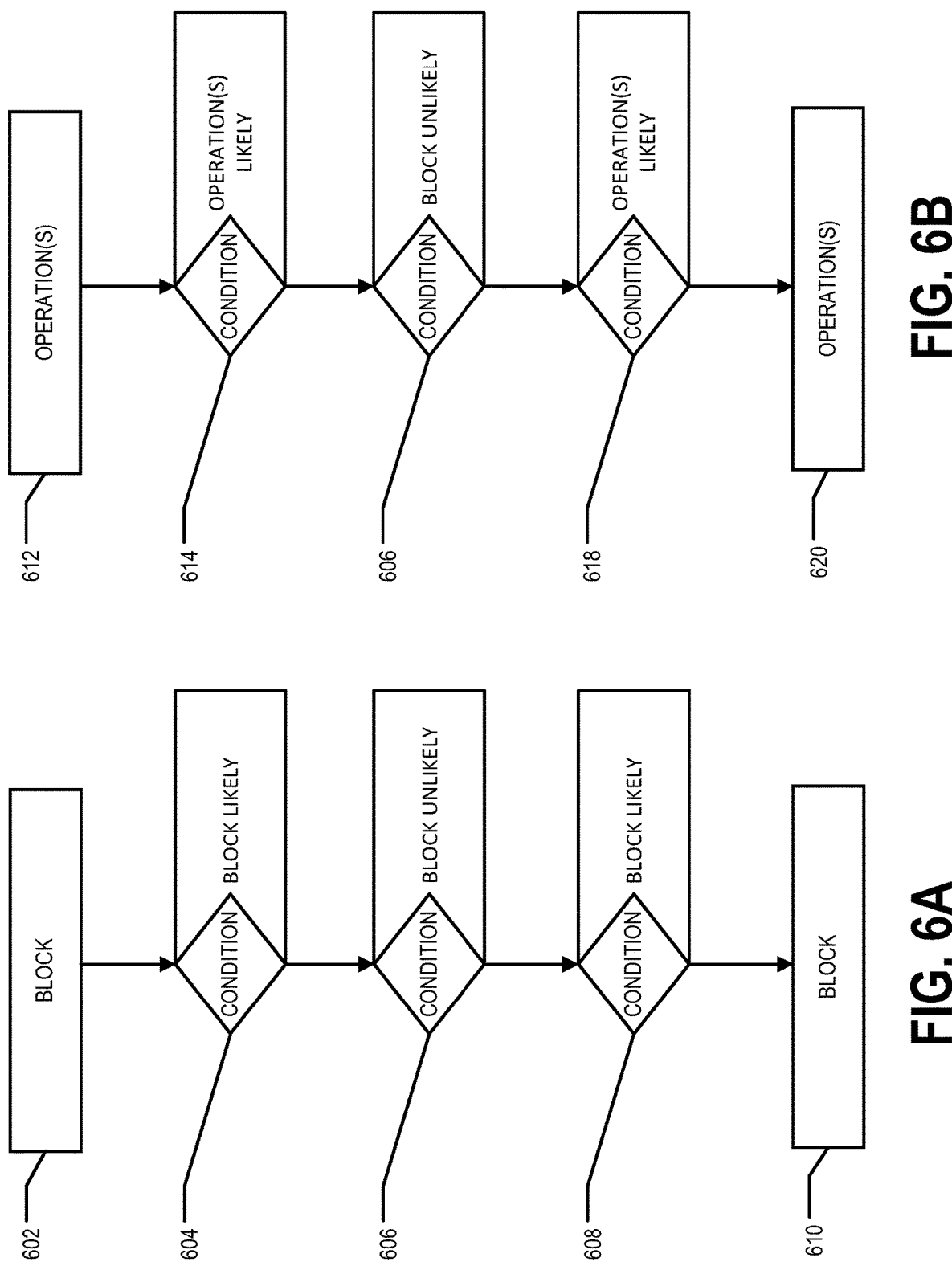

FIG. 6A illustrates various processes, operations, and/or procedures performed to illustrate likely versus unlikely block handling according to various embodiments. FIG. 6A illustrates a first block 602 without conditions. Conditional block 604 illustrates a first conditional block with a condition that is likely to be true. Conditional block 604 illustrates a first conditional block with a condition that is unlikely to be true. Conditional block 608 illustrates a second conditional block with a condition that is likely to be true. Block 610 illustrates a block without conditions. In various embodiments in which the likelihood of conditions is as planned, blocks 602 and 610 will be executed, blocks 604 and 608 will be executed, and block 606 will not be executed. Thus, during planning in such embodiments the operation(s) for blocks determined as likely to execute (e.g., 604, 608) are scheduled as if they are unconditional for planning and optimization while the operation(s) for blocks determined as unlikely to execute (e.g. 606) are not processed further. In these embodiments, while the planning is for conditional blocks 604, 608 to execute, the quantum circuit will not execute these blocks unless their respective conditions are met.

In planning for operations, various embodiments may resolve the blocks of FIG. 6A into the individual operations within each block of operations as illustrate in FIG. 6B. In other words, the block of operations at 602 may be resolved into the operation(s) 612, the conditional block of operations at 604 may be resolved into the conditional operation(s) 614, the conditional block of operations at 606 may be resolved into the conditional operation(s) 616, and the block of operations at 602 may be resolved into the operation(s) 612. As conditional block 606 in an embodiment illustrate in FIG. 6A has been evaluated as being unlikely, the conditional block 606 is not resolved into individual operations. Not resolving conditional block 606 into individual operations minimizes the resources necessary to compile the quantum circuit.

Figures 6C, 6D:
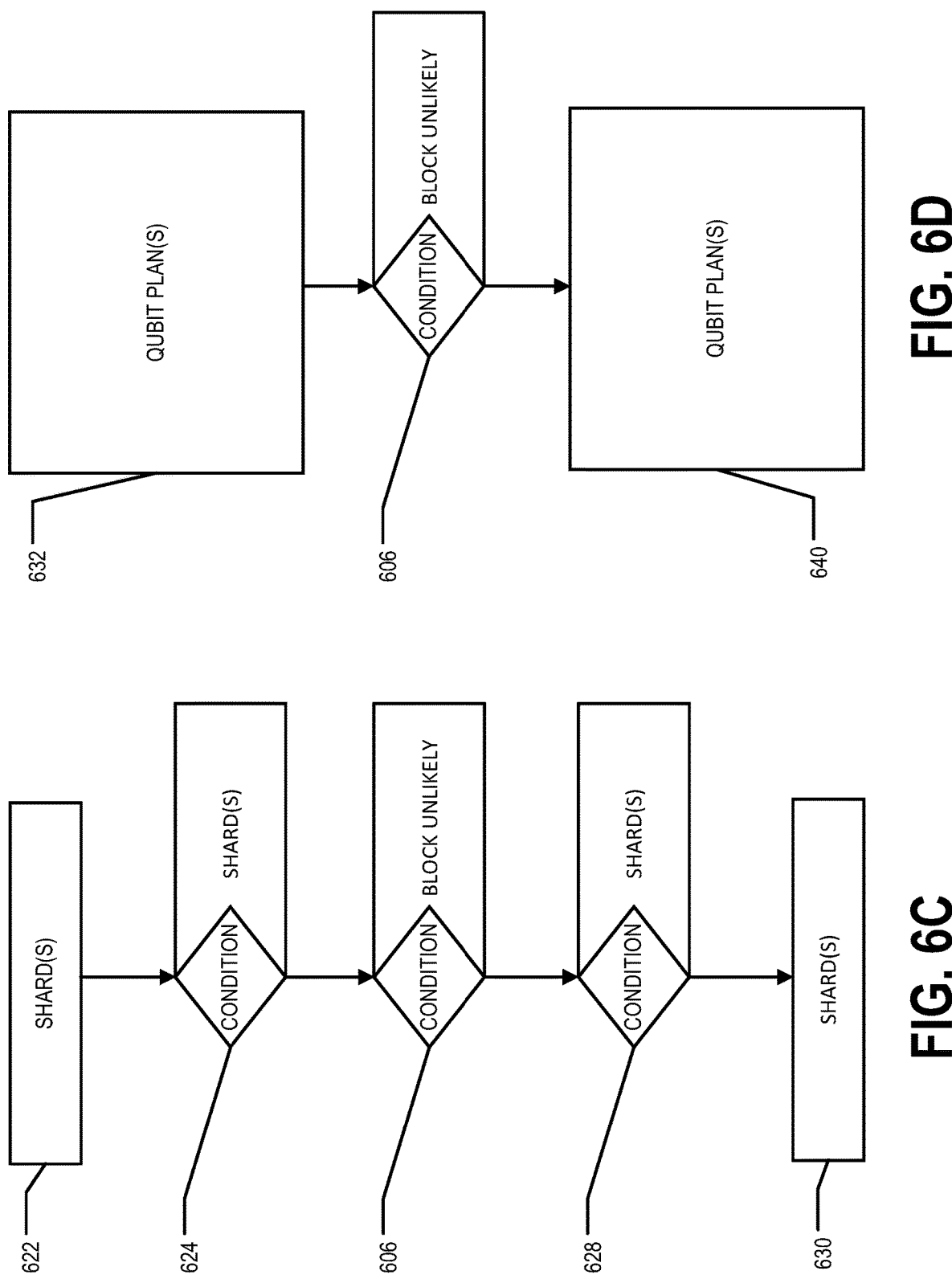

In planning for optimization, various embodiments may resolve the operations of FIG. 6B into shards for each of the operations as illustrate in FIG. 6C. In other words, the operation(s) at 612 may be resolved into the shard(s) 622, the conditional operation(s) at 614 may be resolved into the conditional shard(s) 624, the conditional operation(s) at 616 may be resolved into the conditional shard(s) 616, and the operation(s) at 620 may be resolved into shard(s) 630. As conditional block 606 in an embodiment illustrate in FIG. 6A has been evaluated as being unlikely and was not resolved into operation(s), the conditional block 606 is not resolved into shard(s).

During optimization, the shards, including that they provide for scheduling of operations, may be optimized, such as by reordering the shards. In various embodiments, optimizing the shards allows for the evaluation of costs, including the minimization of costs, such as transport time. In various embodiments, analyzing the location and ordering of one or more qubits in the trap provides for evaluation of the cost to transport or gate the one or more qubits.

FIG. 6D illustrates how the qubit(s) plan may address the one or more qubits operated on by shards 622, 624, 628, and 630 while conditional block 606 is not evaluated. Shard(s) 624, 628, which were determined as their condition(s) being likely to be met, are evaluated as if they were unconditional shard(s). In other words, the planning includes these shard(s) be executed. Thus shard(s) 622, 624 are planned for such that the starting location and state prior to the execution of shard(s) 622, 624 are known and the ending location and state after execution of shard(s) 622, and 624 are known, which is illustrated with qubit plan(s) 632. Similarly, shard(s) 628, 630 are planned for such that the starting location and state prior to the execution of shard(s) 628, 630 are known and the ending location and state after execution of shard(s) 628, and 630 are known, which is illustrated with qubit plan(s) 640. Without being resolved into shards, conditional block 606 may be a barrier for defining the starting or ending state associated with execution of block 606. However, not resolving conditional block 606 into individual operations and/or shards minimizes the resources necessary to compile the quantum circuit. In such embodiments, the branch handling discussed herein may return one or more qubits to a specific state if a condition is met (e.g., TRUE) when it was previously evaluated as unlikely to occur in order to return the one or more qubits to a location or state expected by a qubit plan(s) 632, 640 (e.g., a position along the expected path).

FIG. 7 is a flowchart illustrating various process, operations, and/or procedures performed by a quantum system controller, according to various embodiments.

At step/operation 702, FIG. 7 illustrates resolving blocks (e.g., block 602) to individual operation(s). Various embodiments may resolve only unconditional blocks (e.g., 602, 610) and conditional blocks evaluated as likely (e.g., 604, 608) into operations. In alternative embodiments, such as those with a flat rating, all blocks (e.g., 602, 604, 606, 608, and 610) may be resolved into operations. In other alternative embodiments, only unconditional blocks (e.g., 602, 610) may be resolved into operations. In yet other alternative embodiments, such as those with the likelihood of a conditional block being satisfied be rated by a numerical rating, unconditional blocks that are either above or below the threshold may be resolved to operations.

At step/operation 704, operations are resolved into shards.

At step/operation 706, shards are converted to qubit plan(s) (e.g., 632, 640). In various embodiments, all conditional shards (e.g., 624, 628) are treated as unconditional and as being executed when converting into qubit plan(s).

In various embodiments, a determination of shards associated with the qubit plan(s) creates a most likely path for the execution of the quantum circuit. For any blocks not on this path (e.g., block 606, which was not converted into operations or shards), various embodiments may handle the requirements of these blocks differently. In an exemplary embodiment, the requirements of this block may be recursively handled with the requirement that the one or more qubits have a defined start and end location and/or state before and after, respectively, each block not on the expected path, though the start location and state does not need to be identical to end location and/or state.

In various embodiments, after the qubit plan(s) have been determined, optimization according to the qubit plan(s). The qubit plan(s) may allow for the reordering of operations performed on the qubits, such as merging of multiple conditional paths, replicating a conditional or unconditional block on multiple paths, or moving transport operations. The optimization may reorder the shards. In various embodiments, the optimization may be performed in order to reduce the number of operations or shards, such as to minimize the transport time. In various embodiments the optimization may be for or more other factors, such as noise or heat, measurements taken (e.g., inputs to conditional blocks), and/or source of error(s). In various embodiments involving loops, optimization may be done to avoid requiring starting or ending states to be locked into specific transport. In various embodiments, the cost-weighting may prefer transport be transitioned prior to any loop-start or after a loop-end.

Exemplary Operation of Conditional Transport Protocol

In various embodiments, execution of quantum circuits with conditional operations requires runtime selection of transport waveforms responsible for moving one or more qubits into specific locations within the ion trap. While there may be multiple conditional operations, the set of waveforms to execute these waveforms is finite. The set of waveforms is developed such that all required transport moves can be accomplished for all possible conditional operations that may be in a user's program. Conditional statements may cause a runtime decision to take, in some embodiments, either a first path or second path. This in turn requires selecting the correct waveform(s) from the waveform set to execute during runtime.

FIG. 8 provides a schematic diagram of an example waveform determination system 800. In various embodiments, the waveform determination system 800 is part of the quantum system controller 30. In an example embodiment, the waveform determination system 800 and/or at least a portion thereof, is part of a computing entity 10. In an example embodiment, the waveform determination system 800 comprises and/or access information stored in databases accessible to the quantum system controller 30. FIG. 8 illustrates four database: raw waveform database 815, waveform metadata database 825, calibration database 830, processed waveform database 840. In alternative embodiments, these databases may be located on the memory of the quantum system controller 30.

The waveform determination system 800 further comprises a waveform solver 810, waveform processor 820, waveform formatter 835, and waveform server 845, in the illustrated embodiment. In various embodiments the functions of these may be performed by processing element(s) 205 and/or memory 210 of the quantum system controller 30. In alternative various embodiments, one of more of these may be separate from quantum system controller 30.

The illustrated waveform determination system 800 further illustrates an RPC (remote procedure call) Interface 850 that provides for an interface to one or more remote interfaces. In various embodiments, remote interfaces may be with real-time sequence builder 855, automated calibration scheduler 860, and operator interface 865. The dashed lines in FIG. 8 indicate that the data transferred between RPC Interface 850 and Real-Time Sequence Builder 855, Automated Calibration Scheduler 860, and/or Operator Interface 865 may be remote or over a network. In alternative embodiments, these may be local connections.

Each of the waveforms necessary for execution of a compiled quantum circuit may be assembled into a library. A program known as the Waveform Server 845 is responsible for processing and loading waveforms that may be necessary for execution of a quantum circuit.

A quantum circuit may be provided to Waveform Server 845. Due to differences in hardware as well calibration of the hardware, a waveform may need to be calibrated before being executed by a waveform generator. In various embodiments, one or more calibrated waveforms are load to one or more AWG (arbitrary waveform generators) in order to be able to execute a specific waveform in response to a condition related to a conditional block. Each waveform is individually identified, such as with a unique identification (e.g., number or string). Then, depending on the condition, the waveform's identification may be used to execute the waveform on the trap electrodes. Before a waveform may be loaded to an AWG module, various embodiments may require the waveform be calibrated to the specific hardware.

In various embodiments, a waveform solver 810 may solve for the waveform needed to perform a transport, gate function, and/or the like. The waveform solver may executed a model or simulation or it may be one or more individuals that solve for various waveforms. The waveforms solved for may be, for example, for the transport of ions from one location to another while minimizing heating and or transport time. The waveform may be represented as a sequence of numbers representing voltages to be applied to an electrode over a sequence of time. A set of each waveform to apply to each electrode over a period of time comprises a waveform file, which may also be stored in Raw Waveform Database 815. The waveform files, however, while specific for an operation are not calibrated for the specific hardware.

The waveform processor 820 may receive an operation to be performed from waveform server 845 and, in response, query the raw waveform database 815 for the associated waveform file to perform the operation. The raw waveform database 815 provides the waveform file, which then may be calibrated. The waveform processor 820 queries the Waveform Metadata Database 825 as well as the Calibration Database 830 for data for calibrating the waveform files. The Waveform Metadata Database 825 provides information for interpolating between waveforms as well as which calibration values are relevant to each waveform. Interpolation may be needed as voltages for two waveforms may not end and begin at the same voltage and interpolation will provide voltage values to go between the end of a first waveform and the beginning of a second waveform. The Calibration Database 830 provides calibration data related to the specific hardware used to calibrate the waveform file such that the waveforms applied to the electrodes will be calibrated to execute the desired operation.

The Waveform Processor 820 provides the Waveform Formatter 835 with the waveform files, the data from the Waveform Metadata Database 825, and the data from the Calibration Database 830, and the Waveform Formatter formats or processes the waveform files to generate the processed waveform files, which may be stored in the Processed Waveform Database 840. The processed waveform files may provide for the voltages that the trap electrodes are to be at when the waveform is applied. The chain of electronics or hardware (e.g., amplification stages) from the AWG module to the electrode(s) may be different require different offsets, such as DC offsets or time varying offsets to vary a waveform over a period of time. For example, in various embodiments, similar electronics (e.g., amplification stages) may be used, but the individual electronics may have different electrical characteristics, even if small, that requires a different offset. Further, certain hardware may require different formatting of waveforms to load on the hardware (e.g., binary, csv files, etc.). In various embodiments the Waveform Formatter 835 may also scale the waveforms according to specific hardware. In various embodiments the Waveform Formatter 835 may be hardware agnostic and only apply the calibration data as it is provided from the Waveform Processor 820. The processed waveform files are stored in the Processed Waveform Database 840 to be accessed by the Waveform Server 845 so that the Waveform Server 845 may access the processed waveforms, including not needing to have a waveform recalibrated, and provide the processed waveform to the AWG FPGA 870, which may be one or more FGPAs which will generate the voltages comprising the processed waveforms. In various embodiments, both the waveform files and the processed waveform files may refer to a set of waveform that comprises multiple waveforms.

Due to variations over time in the operating conditions of the ion trap, calibrated DC offset values may periodically be updated and applied to the voltages contained in the waveform files. The calibrated DC offset values may be updated regularly-scheduled updates or when an operator provides an update. The Automated Calibration Scheduler 860 performs a regularly-scheduled updates to the calibrated DC offset values. The Operator Interface 865 may allow for an operator or user to provide, among other things, updated values for calibration. In various embodiments, the Operator Interface 865 may also allow for an operator to initiate a routine that causes system measurements used to determine and update calibration data, the waveform files to be calibrated according to current calibration data as well as be formatted, including the addition of linear interpolations between waveforms based on an agreed-upon set of starting and ending voltages to account for variations between, for example, the end of a first waveform and the beginning of a second waveform. In such embodiments, a user using the Operator Interface 865 causes the calibration data to be updated.

The Waveform Server 845 loads the processed waveform files into the memory of the one or more AWG FPGA 870. In various embodiments, the Waveform Server 845 also maps a waveform's identification number or string and the in-memory index of that waveform on the AWG hardware as well as the waveform's playback duration. The Waveform Server 845 may provide this mapping to the Real-Time Sequence Builder 855. During real-time sequence construction, the Real-Time Sequence Builder 855 uses the mapping from the waveform server to insert the proper AWG memory waveform index and waveform duration into the real-time sequence code in order to identify and execute the waveform associated with a desired operation, such as, in various embodiments, operations associated with a conditional block (e.g., 606).

The dashed connection between Waveform Server 845 and the one or more AWG FPGA 870 is because the one or more AWG FPGA 870 may be located on a physical chassis.

The connections in FIG. 8 may have arrows going in one or more directions to indicate a primary data flow, but an arrow is not restrictive as it is contemplated for data to flow between each of the connected components of FIG. 8. For example, in various embodiments queries will be made between two components, which require a query to be made in a first direction and a response in the second direction.

FIG. 9 provides a schematic diagram of an example hardware that may be used in accordance with an example embodiment. FIG. 9 illustrates a PC 910, a control system 920, and three chassis 930A, 930B, and 930C. While the embodiment illustrated in FIG. 9 illustrates 3 chassis, any number of chassis may be present and connected as generally illustrated in FIG. 9. The embodiment illustrated in FIG. 9 has each chassis comprised of a PCI module (e.g., 940A, 940B, and 940C), one or more AWG modules (e.g., 950A1, 950A2 on chassis 930A; 950B1, 950B2, 950B3 on chassis 930B; and 950C1, 950C2, and 950C3 on chassis 930C), and one or more backplane connection cards (e.g., 970A on chassis 930A, 970B1 and 970B2 on chassis 930B, and 970C1 and 970C2 on chassis 930C). In various embodiment, each AWG module may contain one or more AWG FPGA 870. In various embodiments, each AWG module may be load with a one or more waveforms, and each waveform will identified by its unique ID. Additionally, the embodiment illustrated in FIG. 9 has a Digital Input Module 960 in chassis 930A. As illustrated in FIG. 9, a PC 910 is connected to the PCI module 940A of chassis 930A via connection 980A and quantum system controller 30 is connected to AWG module 950A1 via connection 985 and to Digital Input Module 960 via connection 990. In various embodiments, PC 910 may be the Waveform Server 845 of the waveform determination system 800, and the processed waveform files may be loaded to the AWG modules 950A1 and 950A2 of chassis 930A via connection 980A to PCI Module 940A. The PCI Module of each chassis are connected (e.g., via connection 980B and 980C), and the processed waveform files related to a specific AWG module are loaded to that AWG modules via a PCI Module on the chassis of the specific AWG module. In this manner, a waveform may be preloaded onto an AWG module prior to the runtime evaluation of any conditional statements.

During runtime, an AWG module is selected so that the waveform preloaded to it may be executed. In various embodiments, the waveform may be selected via a register in a Digital Input Module (DIM). In such embodiments, the quantum control system 30 communicates with the DIM via connection 930, which may send signals, such as using TTL (transistor-transistor logic) or other specific protocols, to send bits selecting a waveform in a specific AWG module by its waveform ID. In various embodiments, if more bits are required than can be transferred in parallel to the DIM, multiple transmission rounds of bits may be executed in serial to identify a single waveform ID. In various embodiments additional options for a waveform, such as playback speed, may be specified with additional data transfers.

Once the waveform ID (or other options) have been received by the DIM, the information is transferred to the AWG modules via the chassis backplane. If, as illustrated in FIG. 9, multiple chassis are required due to the hardware of the quantum computer 110, the backplanes may be synchronously connected via dedicated backplane connection modules and cabling. FIG. 9 illustrates one embodiment with backplane connections 970A, 970B1, 970B2, 970C1, and 970C2 and connections 995A, 995B connecting the backplanes of chassis 930A, 930B, and 930C.

FIG. 10 provides a flowchart of processes, procedures, operations, and/or the like performed, for example, by a quantum system, according to various embodiments. At step/operation 1002, the quantum system controller receives a waveform sequence associated with a quantum circuit. In various embodiments, the quantum circuit is associated with a likely path of operations determined to be executed.

At step/operation 1004, the quantum system controller 30 receives calibration data, which may include metadata used to calibrate a waveform wave. In various embodiments, and as described herein, the calibration data may come from one or more sources of calibration data.

At step/operation 1006, the calibration data may be used to generate processed waveform files. In various embodiments, and as described herein, the calibration data may be used to format the waveform files for use with specific hardware.

At step/operation 1008, the processed waveform files may be used to preload waveforms to the AWG FPGAs. In various embodiments, the AWG FPGAs may be located on one or more AWG modules on a chassis.

At step/operation 1010, one or more of the preloaded waveforms may be executed. In various embodiments, once all the AWG modules are preloaded with a waveform, the waveform playback is initiated via a connection 985 between the quantum system controller 30 and an AWG module, which distributes the signal from the quantum system controller 30 to all the AWG modules via the chassis backplane connections. The quantum system controller 30 provides a signal or trigger to execute the playback of a waveform by one or more AWG modules.

In various embodiments, multiple rounds of parallel bit transfers between the quantum system controller 920 may be used to encode higher bit-depth information and additional info in order to not only identify a waveform ID at an AWG module but also provide a playback speed.

For example, as illustrated in FIG. 11, using a 6-bit trigger signal, transfers at times T0 and T1 together might encode a 6-bit waveform ID, and transfers T2 and T3 might encode a 6-bit lookup value for playback speed using, with signals, for example, transmitted with channels having Enable, B0 and B1. In alternative embodiments, additional channels may allow for the transfer of additional bits, which may allow for additional information to be transferred.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:

generating, by a processing device of a quantum system controller of a quantum computer, a set of processed waveform files from a set of waveform files, wherein the set of waveform files are associated with one or more operations and are to be calibrated, wherein the processed waveform files are calibrated for at least a chain of electronics between one or more arbitrary waveform generators and one or more electrodes of the quantum computer, and wherein the processed waveform files are configured to cause a quantum processor of the quantum computer to perform one or more operations of a quantum circuit;

causing, by the processing device, the processed waveform files to be preloaded to one or more arbitrary waveform generators; and causing, by the processing device and after the processed waveform files are preloaded to the one or more arbitrary waveform generators, at least one signal to be provided to the one or more arbitrary waveform generators to execute at least one of the preloaded processed waveform files, wherein the signals provided to arbitrary waveform generators to execute at least one of the preloaded waveform files is in response to the quantum system controller evaluating a conditional operation.

2. The method of claim 1, further comprising:

receiving, by the processing device and prior to the generation of the set of processed waveform files, one or more blocks;

compiling, by the processing device, each of the one or more blocks into the quantum circuit;

analyzing the quantum circuit for qubit placement; and determining an expected path for the quantum circuit based on at least the qubit placement.

3. The method of claim 1, wherein the quantum circuit is comprised of one or more conditional operations, and wherein there is an expected path for the execution of the one or more conditional operations of the quantum circuit and wherein the response to the quantum system controller evaluating a conditional operation causes the execution of a waveform corresponding to an unexpected path, the unexpected path being different from the expected path of the quantum circuit.

4. The method of claim 3, further comprising:

causing, by the processing device, at least one second signal to be provided to the one or more arbitrary waveform generators to execute at least one of the preloaded waveform files to execute a merging operation to move to a position along the expected path.

5. The method of claim 1, wherein the quantum circuit has been optimized to reduce a cost.

6. The method of claim 5, wherein the cost is transport time.

7. The method of claim 1, wherein the set of processed waveform files corresponds to an expected path of the quantum circuit.

8. The method of claim 1, wherein generating the set of processed waveform files comprises:

determining waveform files associated with the quantum circuit;

receiving calibration data associated with the waveforms and the quantum circuit; and formatting the waveform files with the calibration data.

9. The method of claim 8, wherein the calibration data includes a unique waveform ID.

10. The method of claim 8, wherein the calibration data includes a playback speed.

11. A quantum system controller comprising:

a processing device comprising at least one first processing element;

wherein the first processing element is configured to:

generate a set of processed waveform files from a set of waveform files, wherein the set of waveform files are associated with one or more operations and are to be calibrated, wherein the processed waveform files are calibrated for at least a chain of electronics between one or more arbitrary waveform generators and one or more electrodes of the quantum computer, and wherein the processed waveform files are configured to cause a quantum processor of a quantum computer to perform one or more operations of a quantum circuit;

cause the processed waveform files to be preloaded to one or more arbitrary waveform generators; and cause, after the processed waveform files are preloaded to the one or more arbitrary waveform generators, at least one signal to be provided to the one or more arbitrary waveform generators to execute at least one of the preloaded waveform files, wherein the signals provided to arbitrary waveform generators to execute at least one of the preloaded waveform files is in response to the quantum system controller evaluating a conditional operation.

12. The quantum system controller of claim 11, wherein the first processing element is further configured to:

receive, by the first processing element and prior to the generation of the set of processed waveform files, one or more blocks;

compile, by the first processing element, each of the one or more blocks into the quantum circuit; and analyze the quantum circuit for qubit placement; and determine an expected path for the quantum circuit based on at least the qubit placement.

13. The quantum system controller of claim 11, wherein the quantum circuit is comprised of one or more conditional operations, wherein there is an expected path for the execution of the quantum circuit, and wherein the response to the quantum system controller evaluating a conditional operation causes the execution of a waveform corresponding to an unexpected path, the unexpected path being different from the expected path of the quantum circuit.

14. The quantum system controller of claim 11, wherein the first processing element is further configured to:

cause, by the processing device, at least one second signal to be provided to the one or more arbitrary waveform generators to execute at least one of the preloaded waveform files to execute a merging operation to move to a position along the expected path.

15. The quantum system controller of claim 11, wherein the quantum circuit has been optimized to reduce a cost.

16. The quantum system controller of claim 15, wherein the cost is transport time.

17. The quantum system controller of claim 11, wherein the set of processed waveform files corresponds to an expected path of the quantum circuit.

18. The quantum system controller of claim 11, wherein generating the set of processed waveform files comprises:

determining waveform files associated with the quantum
  circuit;

receiving calibration data associated with the waveforms
  and the quantum circuit; and formatting the waveform files with the calibration data.

19. The quantum system controller of claim 18, wherein the calibration data includes a unique waveform ID.

20. The quantum system controller of claim 18, wherein the calibration data includes a playback speed.

\* \* \* \* \*